June 5, 1962
H. HACK ET AL
3,037,403
CONTROL DEVICE FOR UNBALANCE-CORRECTING MACHINING OF ROTATING WORKPIECES
Filed Dec. 3, 1958
2 Sheets-Sheet 1
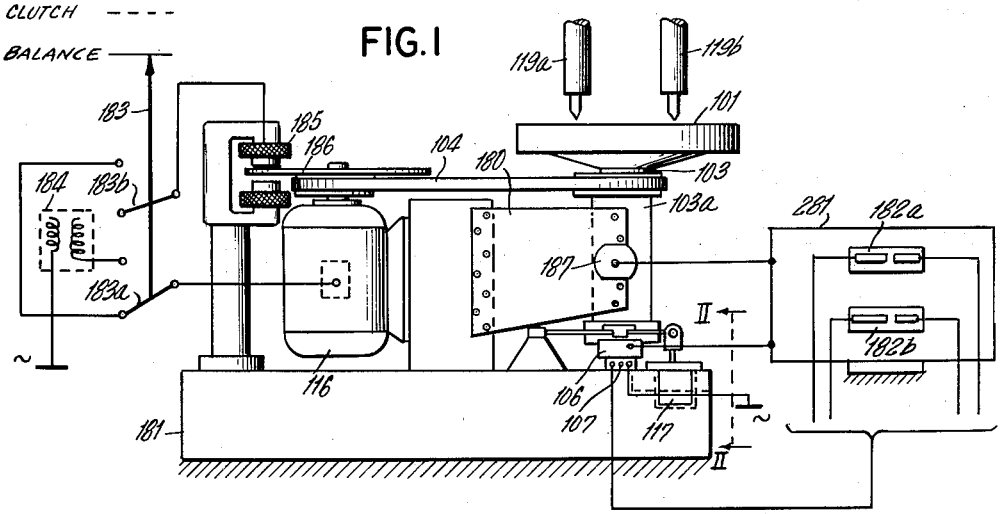
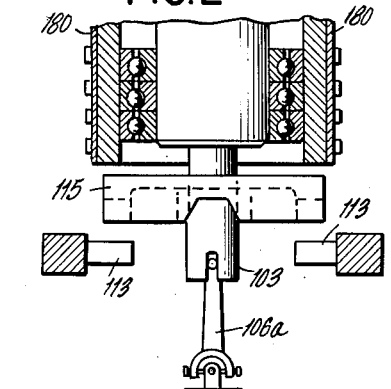
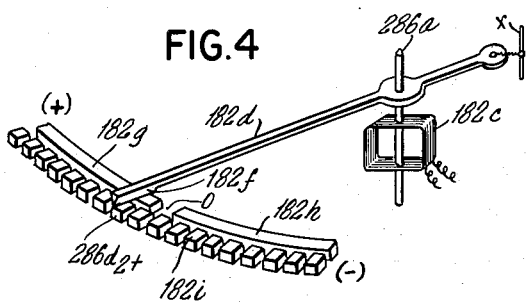
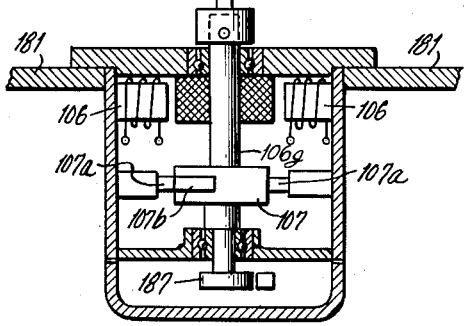
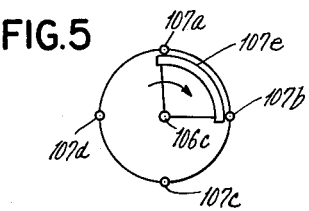

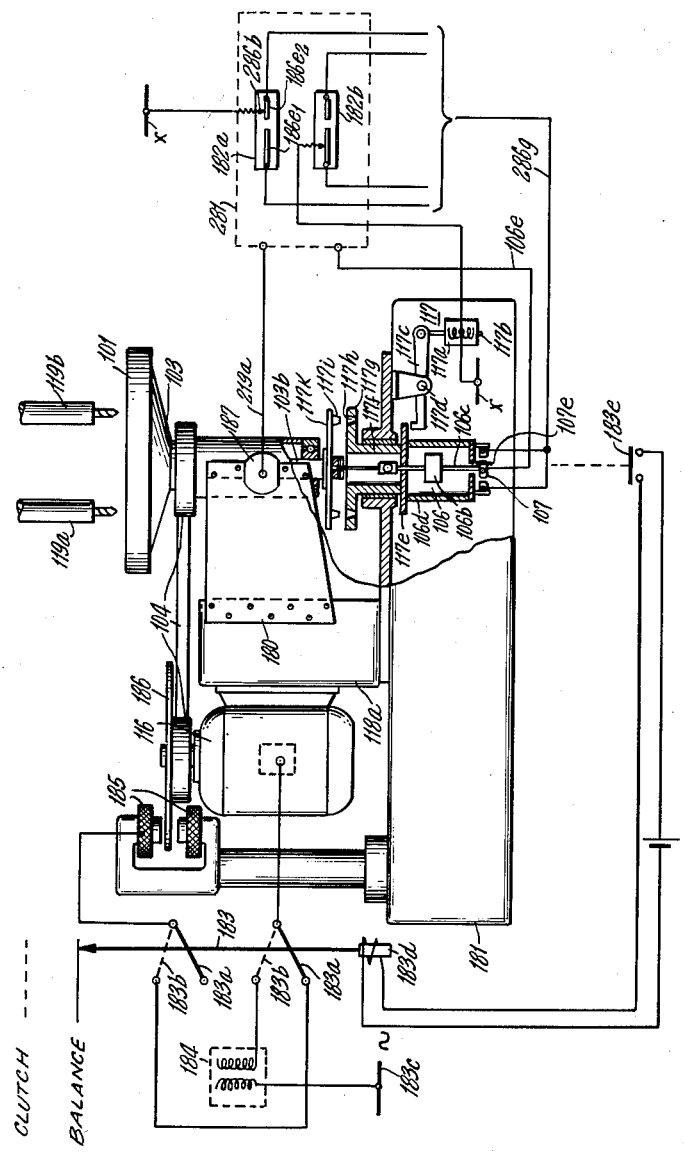

United States Patent Office 3,037,403
Patented June 5, 1962

3,037,403
CONTROL DEVICE FOR UNBALANCE-CORRECTING MACHINING OF ROTATING WORKPIECES
Heinrich Hack and Gunter Jungke, Darmstadt, Germany, assignors to Carl Schenck Maschinenfabrik G.m.b.H., Darmstadt, Germany, a corporation of Germany
Filed Dec. 3, 1958, Ser. No. 778,011
3 Claims. (Cl. 77—5)

The present invention relates to methods and apparatus for determining unbalance of a rotating body as to magnitude and angular position of such unbalance, and for controlling the machining or other fabricating operation required for eliminating such unbalance in accordance with the previously measured unbalance values.

The present application is a joint continuation-in-part of sole application Serial No. 606,929, filed August 29, 1956 issued as Patent No. 2,933,984, dated April 26, 1960 in the name of Heinrich Hack.

The above-mentioned application describes a method and apparatus for dynamic balancing of rotating workpieces by means of unbalance-vibration responsive measuring means whose unbalance-angle indicating member is provided with an electric signal transmitter. The balancing errors of the workpiece, with reference to one or more correction planes, are electrically determined as to their position and also, preferably, as to the magnitude, by a balancing apparatus comprising a wattmeter, or similar measuring instrument, and a phase- or angle-reference transmitting device.

Upon completion of the balance measuring operation proper, the signal transmitter controls an arresting or positioning device which secures the workpiece, during rotation of the latter, in the one proper position needed for a fabricating tool to remove or add material for correction of the previously measured valance. This application pertains to that arresting or position controlling device.

It is essential for this control device that an arresting device which can be switched on and off be provided between the phase-angle transmitter and either the rotating workpiece or a machine part rotating in a fixed angular relation to the workpiece. According to the invention, the arresting device is automatically switched into operation by the release of an electric control impulse effected by the phase-angle transmitter, in order to stop and arrest the workpiece in the correct angular position required for the unbalance-correcting operation. The turning of the workpiece into the correct angular position required for the correcting machining operation is performed manually by the attendant or by switching on an electric motor.

The method and apparatus according to the invention described in the parent application are predicated upon measuring the unbalance of a rotating body on a balancing machine, as regards angular position and magnitude of unbalance, with the aid of one or more auxiliary alternating-current generators to serve as phase transmitter and one or more vibration pick-ups for transmitting electric intelligence indicative of the unbalance to be determined.

According to a feature of the present invention, we provide a controllable arresting device between the angularly displaceable stator of the generator, on the one hand, and the rotor body being processed or a part of a balancing machine running in synchronism with that body, on the other hand. The arresting device serves to block the body, hereinafter called "workpiece," in the proper machining or fabricating position and possesses a member that is angularly displaceable in accurately fixed relation to the angular displacement of the generator stator. When this member occupies a position indicative of the unbalance angle, it is put into clutching engagement with the workpiece holder, preferably by release of an electric control effect, thus reliably blocking the workpiece in the correct angular position for unbalance-compensating operation.

The rotor to be balanced is blocked by the arresting device, for instance by actuation of a relay, whereafter the position of the workpiece is accurately fixed as needed for performing the unbalance-eliminating operation.

It is among the objects of the present invention to improve such controls toward greater accuracy and to minimize the skill and attention required for performing and supervising the balancing operation.

Another object of the invention is to afford a completely automatic unbalance-eliminating operation.

It is a further object of the invention to also automatically control the above-mentioned machining operation in accordance with the angular position of unbalance determined by measurement.

To this end, and in accordance with the present invention, we provide a measuring device with electric control contacts which take care of automatically adjusting the workpiece in the correct angular position for machining, by also controlling the arresting of the workpiece in that position.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 illustrates schematically a front view of an automatically operating machine equipped with an arresting device for operation in accordance with the component measuring method;

FIG. 2 shows, partly in section, a portion of the machine located between, and seen in the direction of, the two arrows II—II indicated in FIG. 1 and showing an alternate construction of the latching device;

FIG. 3 shows schematically and partially in section, the balancing apparatus of FIG. 1, but with the switching device shown in more detail;

FIG. 4 is a schematic and perspective view of a wattmetric control instrument forming a component of the same machine; and FIG. 5 shows schematically in plan view individual parts of the measuring and control device of FIG. 3 on a larger scale.

It will be recognized from the embodiments described in detail in the above-mentioned parent application Serial No. 606,929, that the invention thereof permits placing the workpiece into the proper position for balance correcting operation without requiring any calculation or evaluation of the unbalance measuring results by the attendant, and that the rotor is automatically and reliably arrested in the proper position during the unbalance-eliminating operation. In the embodiments described in the above-mentioned application, the slow turning of the rotor to be balanced into the correct position needed for the unbalance-removing drilling, welding or other operation is effected either manually or by means of an electric motor to be controlled by the attendant until the arresting device becomes clutched in or the proper signal is issued. However, according to another object of our invention, a signal representing the angular position and magnitude of unbalance measured may also be automatically transmitted to the device for turning the workpiece into the proper unbalance-eliminating position, or to the device for eliminating the unbalance condition. According to another feature of our invention, therefore, the setting of the workpiece to the angular position required for accurate unbalance elimination is automatically effected by one or more measuring instruments which are equipped with contact arms at the rotating part of the instrument. According to further features of the invention relating to the same object, the adjustment of the workpiece to the correct angular position for balance correction is carried out during the balance-measuring run with the aid of the same drive that rotates the workpiece during that measuring run; and means are provided for producing a braking torque which imparts to the drive the slow speed desired for the subsequent workpiece-setting operation.

According to FIG. 1, the workpiece 101 to be balanced is mounted on a carrier shaft 103 driven by a belt transmission 104 from an electric motor 116. The bearing assembly 103a of shaft 103 is secured to the machine base 181 by means of flat springs 180. The bearing oscillations due to unbalance of the workpiece 101 are translated into electric voltage by means of an oscillation pickup 187. The pickup voltages are supplied to electric measuring instruments 182a and 182b, preferably of the wattmetric type, for measuring and, if desired, for also indicating the unbalance values. Mounted at the lower end of shaft 103 is an alternating-current generator 106 (FIGS. 1, 2) to serve as a phase transmitter. Generator 106 is connected with shaft 103 by a cardanic coupling or universal joint 106a (FIG. 2) so that the rotor shaft 106g of the generator runs in synchronism with, and in a fixed phase relation to, the workpiece-carrier shaft 103. The phase transmitter 106 has two stator windings or two stators which are 90° phase-displaced relative to each other. As a result, the phase transmitter 106 (FIGS. 1, 2) supplies a sine-wave voltage to the measuring instrument 182a and a cosine voltage to the measuring instrument 182b, or vice versa. Both measuring instruments are designed as contact wattmeters as shown in FIG. 4 by way of example.

According to FIG. 4, showing only a portion of one of the two instruments, the movable instrument system comprises a moving coil 182c and a contact arm 182d rotating together with coil 182a. The zero position (0) of arm 182d is located in the mid-position of the deflecting range. Arm 182d carries a contact 182f which may enter into contact engagement with one or the other of two elongated contact bars 182g and 182h, depending upon whether arm 182d is deflected toward the plus (+) or minus (−) direction from the zero position. The contact 182f is further engageable with any one of a number of mutually insulated contacts 182i, depending upon the direction and amount of deflection. Instead of having the contact 182f of arm 182d in continuous sliding contact with the stationary contacts, we prefer using a design in which the contact 182f is normally free to move over the stationary contacts without engaging them and is then intermittently pressed against the stationary contacts by a setting member or dropping stirrup as is conventional for such instruments. Depending upon which of the stationary contacts 182g and 182h is contacted at a time in the two instruments, these instruments permit selectively controlling the arresting device for the workpiece 101 as regards four different arresting positions relative to the unbalance-eliminating tools, here consisting of drills 119a and 119b (FIG. 1). The electric impulses issuing from the instruments 182a and 182b are supplied to a commutator switch 107 (FIGS. 1, 2) driven by the phase transmitter 106. The collector switch 107 passes the impulses through an electromagnet 117 when the workpiece 101 reaches the correct angular position required for the balance-correcting operation. The commuator switch 107 is mounted on the shaft 106g of the phase-transmitter and rotates between two carbon brushes 107a. A portion of the periphery of commutator switch 107 is covered by a contact plate 107b of brass or other conducting material which, during each rotation, for a portion of the cycle of switch 107, closes a connection of the excitation circuit for the magnet 117.

A latching plate 115 is secured to the end of the carrier shaft 103 and is so adjusted and rigidly mounted relative to phase-transmitter 106 and collector switch 107 that, when the electromagnet 117 is energized and moves the latch pins 113 upwardly, these pins enter into mating notches of disk 115 and then prevent any further rotation of shaft 103 and workpiece 101.

An alternate construction of the latching device is illustrated in FIG. 3. Instead of the latching plate 115 and pins 113 of FIG. 2, a perforated arresting disk 117g is arranged to be lifted by the action of lever 117c on plate 117e, as is described in more detail below, and mates with arresting dogs 117i of disk 117k to prevent further rotation of the workpiece 101.

For automatic performance of the entire balancing process, the slow revolution of the workpiece, after completion of the unbalance analysis, and the subsequent arresting of the workpiece in the correct angular position must be mechanized. Automatic turning of the workpiece to the arresting position in the embodiments of FIGS. 1 to 5 is controlled by a switching device in conjunction with an eddy-current brake 185, 186.

The eddy-current brake comprises a copper disk 186 mounted on the shaft of drive motor 116 (FIG. 1) and an electromagnetic field system equipped wtih a field coil 185. The control switch 183 for slow turning of the workpiece is a two-pole two-position switch. When switch 183 is in the position "Balance," it supplies the drive motor 116 directly with full line-voltage through the switch contact 183a. After completion of the measuring run, the selector switch 183 is shifted to the position "Clutch." This is preferably done automatically by means of a centrifugal switch 187 (FIG. 2) which responds when the drive motor 116 is disconnected from the line and has decelerated to below a given slow speed. The contact 183a (FIG. 3) of switch 183 now supplies the motor 116 with reduced voltage from a transformer 184. At the same time, the switch contact 183a supplies full line voltage to coil 185 of the brake magnet which induces in the copper disk 186 eddy-currents that impart a counter-torque to the motor. This secures the desired slow turning speed for the workpiece 101 as required for reliably arresting the workpiece in the correct angular position.

Referring now to FIG. 3 the disk-shaped workpiece 101 to be balanced is mounted on a vertical spindle 103 of the balancing plant and is driven through a belt transmission 104 from a motor 116. Two mutually identical flat springs 180 of which only the one in front is visible in FIG. 3, are fastened to a part 118a of the machine-bed structure 181. These springs support the balancer spindle 103 in oscillatory condition in the known manner. The spindle oscillations caused by unbalance during rotation of the workpiece 101 are converted by oscillation pickups 187, for example of the electrodynamic moving-coil type, into electric voltages which are supplied in known manner to the moving coils of two wattmetric or similar measuring instruments 182a and 182b located in the cabinet 281. The connection between pickups and instruments is schematically represented by a line 219a.

The switching device 107 and an auxiliary generator 106, operating as a phase-angle transmitter, are connected with the other end 103b of the spindle 103, for example by means of a cardanic coupling or universal joint 106a so that the switch portion 107e (FIGS. 3, 5) and the rotor 106b of the phase transmitter run in synchronism with the workpiece 101. During its rotation the switch segment 107e touches (FIG. 5) four contacts 107a to 107d which are in connection with an electromagnetic arresting device 117, as will be described below. The phase-angle transmitter issues two alternating voltages 90° phase-displaced from each other (sine-voltage and cosine-voltage) of which one reaches the field coils of measuring instrument 182a whereas the other is applied to the field coils of a measuring instrument 182b, the connection being indicated by a lead 106e (FIG. 3).

Both measuring instruments 182a and 182b (FIG. 3) are designed as contact devices as illustrated in FIG. 4. That is, the moving coil 182c in the instruments is provided with a pointer-like arm 182d which carries a contact 182f at its tip. During deflection of the moving coils the contact tip passes over a series of mutually insulated individual contacts 182i. The position of rest of coil 182c and arm 182d is preferably located at about the center or zero point (0) of the entire travel path so that the deflections can be distinguished as to their direction + or —. Located between the pivot shaft 286a of arm 182d and the contacts 182i are magnetizable rails 182g and 182h which are automatically excited, for example by a timing relay, in given intervals of time and which then attract the arm 182d and arrest it in position. The contact arm 182d carries electric voltage from a source $x$. The contacts 182i from the plus series are conductively connected with the contact 107a of the switching device 107. The contacts 182i of the minus series are connected, for example, with contact 107c of the switching device 107. Analogously, in the contact wattmeter 182b, the contact series are conductively connected with the contact 107b or 107d of the switching device 107. These connections are indicated by a line 286g.

The arresting device comprises the electromagnetic switch 117a (FIG. 3) with an armature 117b to which a double-armed lever 117c is linked, this lever being pivoted at point 117d. The lever 117c acts upon a flange 117e on the housing 116d of the auxiliary generator 106 and thus can force the perforated arresting disk 117g against a cam disk 117k firmly seated on the balancer spindle 103.

The drive motor 116 carries a metal disk 186 which is mounted on the belt sheave appertaining to the transmission 104. The disk 186 runs between the two magnet poles 185 of an eddy-current brake. The brake can be excited by means of a switch 183 through a transformer 184 from the current supply line 183c. Located above the workpiece-accommodating means of the balancing apparatus is an unbalance-correcting machining device represented by two drills 119a and 119b.

The control device according to the invention operates as follows. When the drive motor 116 is switched on for a measuring run of the workpiece 101 located on the balancer spindle 103, the above-mentioned (not illustrated) timing relay is set into operation. Shortly after the workpiece has reached the normal running speed and after the measuring instruments 182a and 182b have responded, the timing relay causes the rails 182g and 182h to be magnetized. This forces the contact 182f of arm 182d into the deflected position, for example into engagement with the contact $286d_{2+}$. Thus the contact 182f is arrested. The contact of switch 107 which is connected with contact $286d_{2+}$ transfers the voltage of current source $x$ to a neighboring contact of switch 107 which is connected with the minus pole through the arm of the other instrument 182b. Located in this circuit is the coil 117a of the arresting magnet 117, so that this coil now responds. A second timing relay (not illustrated) has disconnected the motor 116 in the meantime; a centrifugal-force switch 183e, mounted on shaft 106c, and connected to coil 183d of switch 183, enters into operation after the speed of the motor has declined sufficiently and then places the switch 183 from the driving position 183a into the braking position 183b. This causes the eddy-current brake 185, 186 to operate; and the motor 116 receives from transformer 184 a current of such reduced voltage that it moves slowly into the arresting position together with the spindle 103 and together with the disk 117k and the arresting dogs 117i. The magnet 117, excited by the voltage from source $x$, pulls the armature 117b downwardly and turns the lever 117c about the pivot 117d. The left lever arm raises the flange 117e together with the housing 106d, thus lifting the disk 117g, guided by a bushing 117f in the bed structure 181, so that the arresting holes 117h are engaged by the dogs 117i of the disk 117k. The engaged contact $286d_{2+}$ and the contact thus placed under voltage in the series 107a–d, indicates the correct angular position of unbalance, so that the arresting device 117 catches the dogs 117h in the arresting holes 117a so that the spindle 103 with the workpiece 101 is arrested in the accurate position and the too-heavy location of the workpiece becomes positioned beneath the drills 119a, 119b. The motor 116 then stops and its energizing circuit switches itself off automatically in known manner. The machining device 119a, 119b can now be automatically fed toward the workpiece, and can be started and controlled. After termination of the correcting work, the arresting operation is terminated by releasing the contact engagement of arm 182d and by disconnecting the electromagnet 117a. The disk 117g with the circle of arresting holes now slides automatically back into the position of rest.

It will be obvious to those skilled in the art, upon a study of this disclosure, that this invention permits of various modifications and alterations with respect to the various machine components and method steps disclosed, and hence can be embodied in equipment other than as particularly illustrated and described herein, without departing from the essential features of the invention and within the spirit and scope of the claims annexed hereto.

We claim:

1. Apparatus for correcting unbalance of a rotatable workpiece by a fabricating operation, comprising a drive for rotating the workpiece, workpiece carrier means and fabricating tool means of which one is rotatably adjustable relative to the other about the axis of said carrier means to place tool and workpiece relative to each other in position for unbalance correction, balance analyzing means comprising two wattmetric instruments for indicating magnitude and angular position of unbalance respectively, each of said instruments having a moving coil and stationary coils, an alternating-current generator having a sine-wave output circuit and a cosine-wave output circuit and having a rotor connected with said drive to rotate in synchronism with the workpiece, unbalance-responsive pick-up means connected with said moving coils, said two output circuits being connected with said stationary coils of said two respective instruments, said one instrument for response to angular position of unbalance having means for arresting its moving coil after deflection of said moving coils, direct-current supply means and alternating-current supply means, selector switch means connecting said direct-current supply means with said rotor when in switching condition for balance analysis but connecting said alternating-current supply means to said rotor as well as to said latter moving coil when in switching condition for balance correction, and relay means connected with said circuits and responsive to occurrence of a given equalizing voltage in said circuits when said alternating-current supply means is connected to said rotor and moving coil and when said proper position of tool means and carrier means is reached, and an arresting device for securing said proper position, and an eddy current brake connected with said drive motor for causing the latter to turn said carrier at creeping speed for operation of said position control device, said eddy-current brake comprising a copper disc mounted for rotation with the shaft of said drive motor, an electromagnetic field system provided with a brake magnet having a pair of field coils disposed on opposite sides of said disc for inducing eddy currents in said disc when said coils are energized so as to impart a counter-torque to said disc in a direction opposed to the rotational direction imparted to said disc by said motor, a selector switch movable into a first position for supplying to said electric motor a predetermined full line voltage during a balance-measuring run of the apparatus and movable into a second position for supplying to said motor a reduced voltage subsequent to said measuring run, centrifugal switch means connected with said motor shaft and responsive to deceleration of said motor shaft below a predetermined speed for shifting said selector switch to said second position, said selector switch having contact means closed in said second position for supplying voltage to energize said magnet field coils, whereby the speed of said motor and said carrier is reduced to said creeping speed.

2. Apparatus for correcting unbalance of a rotatable workpiece by a fabricating operation, comprising a drive for rotating the workpiece, workpiece carrier means and fabricating tool means of which one is rotatably adjustable relative to the other about the axis of said carrier means to place tool and workpiece relative to each other in position for unbalance correction, balance analyzing means comprising two wattmetric instruments for indicating magnitude and angular position of unbalance respectively, each of said instruments having a moving coil and stationary coils, and alternating-current generator having a sine-wave output circuit and a cosine-wave output circuit and having a rotor connected with said drive to rotate in synchronism with the workpiece, unbalance-responsive pickup means connected with said moving coils, said two output circuits being connected with said stationary coils of said two respective instruments, said one instrument for response to angular position of unbalance having means for arresting its moving coil after deflection of said moving coils, direct-current supply means and alternating-current supply means, selector switch means connecting said direct-current supply means with said rotor when in switching condition for balance analysis but connecting said alternating-current supply means to said rotor as well as to said latter moving coil when in switching condition for balance correction, and relay means connected with said circuits and responsive to occurrence of a given equalizing voltage in said circuits when said alternating-current supply means is connected to said rotor and moving coil and when said proper position of tool means and carrier means is reached, and an arresting device for securing said proper position, including speed-responsive control means, and circuit means connecting said latter control means with said arresting device to prevent operation of said arresting device when the workpiece speed is above a given value, and an eddy current brake connected with said drive motor for causing the latter to turn said carrier at creeping speed for operation of said position control device, said eddy-current brake comprising a copper disc mounted for rotation with the shaft of said drive motor, an electromagnetic field system provided with a brake magnet having a pair of field coils disposed on opposite sides of said disc for inducing eddy currents in said disc when said coils are energized so as to impart a counter-torque to said disc in a direction opposed to the rotational direction imparted to said disc by said motor, a selector switch movable into a first position for supplying to said electric motor a predetermined full line voltage during a balance-measuring run of the apparatus and movable into a second position for supplying to said motor a reduced voltage subsequent to said measuring run, centrifugal switch means connected with said motor shaft and responsive to deceleration of said motor shaft below a predetermined speed for shifting said selector switch to said second position, said selector switch having contact means closed in said second position for supplying voltage to energize said magnet field coils, whereby the speed of said motor and said carrier is reduced to said creeping speed.

3. In an apparatus for correcting unbalance of a rotatable workpiece by a fabricating operation and equipped with an electric drive motor for rotating the workpiece about the rotational axis of the workpiece and having a balance-measuring device provided with a pickup responsive to unbalance vibration of the workpiece when the workpiece is being driven by said drive motor and having an angularly displaceable indicating member whose angular position is indicative of that of the workpiece unbalance being measured, and further equipped with workpiece carrier means and fabricating tool means of which one is rotatably adjustable relative to the other about the axis of said carrier means to place the tool and workpiece relative to each other in position for unbalance correction, with a position-control device for arresting said one rotatable adjusting means in said unbalance-correcting position; the improvement comprising an eddy-current brake connected with said drive motor for causing the latter to turn said carrier means at creeping-speed for operation of said position-control device, said eddy-current brake comprising a copper disc mounted for rotation by said drive motor, an electromagnetic field system provided with a brake magnet having a field coil for inducing eddy currents in said disc to impart a counter-torque therein in a direction opposed to the rotational direction imparted to said disc by said motor, a selector switch movable into a first position for supplying to said electric motor a predetermined full-line voltage during a balance-measuring run of the apparatus and movable into a second position for supplying to said motor a reduced voltage subsequent to said measuring run, centrifugal switch means connected with said motor shaft and responsive to deceleration of said motor shaft below a predetermined speed for shifting said selector switch to said second position, said selector switch having contact means closed in said second switch position for supplying voltage to said magnet field coil, whereby the speed of said motor and said carrier means is reduced to said creeping speed.

References Cited in the file of this patent

UNITED STATES PATENTS 2,933,984     Hack _____ Apr. 26, 1960